United States Patent
Jung et al.

(10) Patent No.: US 9,615,277 B2
(45) Date of Patent: Apr. 4, 2017

(54) METHOD FOR DETERMINING POSITION BASED ON NETWORK AND ELECTRONIC DEVICE THEREOF

(71) Applicant: Samsung Electronics Co., Ltd., Suwon-si, Gyeonggi-do (KR)

(72) Inventors: Bu-Seop Jung, Suwon-si (KR); Jun-Ho Lee, Yongin-si (KR); Young-Kwan Chung, Yongin-si (KR); Jong-Mu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 14/499,838

(22) Filed: Sep. 29, 2014

(65) Prior Publication Data

US 2015/0092584 A1    Apr. 2, 2015

(30) Foreign Application Priority Data

Oct. 2, 2013 (KR) .................. 10-2013-0117947

(51) Int. Cl.
| | | |
|---|---|---|
| *H04W 4/00* | (2009.01) | |
| *H04L 12/66* | (2006.01) | |
| *H04W 24/08* | (2009.01) | |
| *H04W 52/00* | (2009.01) | |
| *G01S 5/00* | (2006.01) | |
| *H04W 84/12* | (2009.01) | |
| *H04W 64/00* | (2009.01) | |

(52) U.S. Cl.
CPC ........... *H04W 24/08* (2013.01); *G01S 5/0045* (2013.01); *H04W 52/00* (2013.01); *H04W 64/00* (2013.01); *H04W 84/12* (2013.01)

(58) Field of Classification Search
CPC ............ G01S 19/258; H04M 1/72522; H04M 1/72572; H04W 52/028; H04W 48/12; H04W 8/18
See application file for complete search history.

(56) References Cited

U.S. PATENT DOCUMENTS

| | | | |
|---|---|---|---|
| 2004/0121784 A1* | 6/2004 | Park ...................... | H04W 64/00 455/456.1 |
| 2009/0047973 A1* | 2/2009 | MacNaughtan ...... | G01S 5/0252 455/456.1 |
| 2009/0098903 A1* | 4/2009 | Donaldson ............ | G01S 19/258 455/552.1 |
| 2009/0104917 A1* | 4/2009 | Ben Rached ......... | H04W 64/00 455/456.1 |
| 2013/0121325 A1* | 5/2013 | McCann ............... | H04W 48/12 370/338 |
| 2013/0172019 A1 | 7/2013 | Youssef et al. | |
| 2013/0188626 A1 | 7/2013 | Lakhzouri et al. | |
| 2013/0191231 A1 | 7/2013 | Gazdzinski | |
| 2013/0196681 A1 | 8/2013 | Poduri et al. | |

(Continued)

*Primary Examiner* — Melanie Jagannathan
(74) *Attorney, Agent, or Firm* — Jefferson IP Law, LLP

(57) ABSTRACT

A method for operating an electronic device is provided. The method includes determining, by the electronic device, a position estimation point according to state information of the electronic device. Further, the method includes transmitting a position estimation request message to an Access Point (AP) at the determined position estimation point with a wireless Local Area Network (LAN) connection not being performed, and receiving position information of the electronic device from the AP.

23 Claims, 15 Drawing Sheets

(56) References Cited

U.S. PATENT DOCUMENTS

| | | | | |
|---|---|---|---|---|
| 2013/0310077 A1* | 11/2013 | Siomina | ............... | H04W 4/02 |
| | | | | 455/456.2 |
| 2014/0112327 A1* | 4/2014 | Calcev | ............... | H04W 48/14 |
| | | | | 370/338 |
| 2014/0247807 A1* | 9/2014 | Westerberg | ......... | H04W 36/34 |
| | | | | 370/331 |
| 2014/0293978 A1* | 10/2014 | Yang | .................. | H04W 8/005 |
| | | | | 370/338 |
| 2014/0315582 A1* | 10/2014 | Dong | ................ | H04W 64/00 |
| | | | | 455/456.2 |
| 2015/0341892 A1* | 11/2015 | Aldana | .............. | H04W 64/00 |
| | | | | 455/456.2 |

* cited by examiner

MEANS FOR DETERMINING POSITION ESTIMATION POINT DEPENDING ON STATE INFORMATION OF ELECTRONIC DEVICE — 411

MEANS FOR TRANSMITTING POSITION ESTIMATION REQUEST MESSAGE TO AP AT DETERMINED POSITION ESTIMATION POINT WITH A WIRELESS LAN CONNECTION NOT BEING PERFORMED — 413

MEANS FOR RECEIVING POSITION INFORMATION OF ELECTRONIC DEVICE FROM AP — 415

FIG.4B

| Category | Action | Dialog Token | Advertisement Protocol IE | Query Request Length | Query Request |
|---|---|---|---|---|---|

GAS Initial Request Action Frame

| Category | Action | Dialog Token | Status Code | GAS Comeback Delay | Advertisement Protocol IE | Query Response Length | Query Response |
|---|---|---|---|---|---|---|---|

GAS Initial Response Action Frame

| Advertisement Protocol Information Element | | | |
|---|---|---|---|
| | | Advertisement Protocol Tuple | |
| Element ID | Length | Query Response Length Limit | PAME-BI | Advertisement Protocol ID |
| 108 | | 0000000 | 0 | 0 |

| Name | Value |
|---|---|
| Access Network Query Protocol | 0 |
| MIH Information Service | 1 |
| MIH Command and Event Services Capability Discovery | 2 |
| Emergency Alert System (EAS) | 3 |
| Reserved | 4-220 |
| Vendor Specific | 221 |
| Reserved | 222-255 |

901 points to the "Access Network Query Protocol" row; 903 points to the "Vendor Specific" row.

FIG.9

METHOD FOR DETERMINING POSITION BASED ON NETWORK AND ELECTRONIC DEVICE THEREOF

CROSS-REFERENCE TO RELATED APPLICATION(S)

This application claims the benefit under 35 U.S.C. §119(a) of a Korean patent application filed on Oct. 2, 2013 in the Korean Intellectual Property Office and assigned Serial number 10-2013-0117947, the entire disclosure of which is hereby incorporated by reference.

TECHNICAL FIELD

The present disclosure relates to a method for estimating a position of an electronic device and an electronic device without a wireless Local Area Network (LAN) connection in a network-based position service.

BACKGROUND

Most portable terminals such as a smartphone and a tablet Personal Computer (PC), etc., recently brought to the market have a communication module for a wireless LAN connection. Particularly, as communication technologies using wireless LAN connections become more important, technologies that may increase the convenience of a portable terminal based on a wireless LAN connection are provided.

For example, a portable electronic device connected via a wireless LAN may be connected with a specific server or Access Point (AP) using the wireless LAN to transmit/receive data. As wireless LAN connection technology develops, a portable electronic device is not only connected with a specific server or AP, via a wireless LAN, to transmit/receive data but is also connected with a specific server or AP, via a wireless LAN connection, to perform various functions. Furthermore, for example, a portable electronic device may be connected with a specific AP using a wireless LAN to transmit/receive data, and estimate a position of a portable electronic device based on the transmitted/received data. A portable electronic device may perform a connection with a specific AP using a wireless LAN under a user's control, and transmit/receive data required for estimating a position of an electronic device to receive the estimated position information of the electronic device at a position of the AP set in advance.

When estimating position information of an electronic device via a wireless LAN connection, a user of the electronic device may experience the inconvenience of having to establish the wireless LAN connection according to a series of processes.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for estimating a position of an electronic device without a wireless Local Area Network (LAN) connection.

Another aspect of the present disclosure is to provide a method and an apparatus for determining a position estimation point depending on state information of an electronic device.

Another aspect of the present disclosure is to provide a method and an apparatus for transmitting a position estimation request message to an Access Point (AP) at a determined position estimation point with a wireless LAN connection not being performed.

Another aspect of the present disclosure is to provide a method and an apparatus for transmitting a position estimation request message to an AP that meets a condition set in advance with a wireless LAN connection not being performed at a determined position estimation point.

In accordance with an aspect of the present disclosure, a method for operating an electronic device is provided. The method includes determining, by the electronic device, a position estimation point depending on state information of the electronic device, transmitting a position estimation request message to an AP at the determined position estimation point with a wireless LAN connection not being performed, and receiving position information of the electronic device from the AP.

In accordance with another aspect of the present disclosure, an electronic device is provided. The electronic device includes one or more processors, a communication module, a memory, and one or more programs stored in the memory and configured to be executed by the one or more processors, wherein the one or more programs, when executed by the one or more processors, cause the one or more processors to determine a position estimation point depending on state information of the electronic device, transmit a position estimation request message to an AP at the determined position estimation point with a wireless LAN connection not being performed, and receive position information of the electronic device from the AP.

In accordance with another aspect of the present disclosure, a method for operating an AP is provided. The method includes receiving, by the AP, a position estimation request message from an electronic device on which a wireless LAN connection has not been performed, transmitting path loss information measured via the received position estimation request message to an AP controller, receiving position information of the electronic device from the AP controller, and transmitting the received position information to the electronic device.

In accordance with another aspect of the present disclosure, an AP is provided. The AP includes one or more processors, a communication module, a memory, and one or more programs stored in the memory and configured to be executed by the one or more processors, wherein the one or more programs, when executed by the one or more processors, cause the one or more processors to receive a position estimation request message from an electronic device on which a wireless LAN connection has not been performed, transmit path loss information measured via the received position estimation request message to an AP controller, receive position information of the electronic device from the AP controller, and transmit the received position information to the electronic device.

According to various embodiments of the present disclosure, an electronic device in a network-based position service determines a position estimation point, transmits a position estimation request message and a position information request message to an AP with a wireless LAN connection not being performed at the determined point, and then receives a position information message from the AP as a response to the position information request message, so that power consumption caused by unnecessary position estimation in the electronic device may be reduced, and inconvenience caused by a wireless LAN connection process may be resolved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4B is a view illustrating means for updating position information of an electronic device without a wireless LAN connection in the electronic device according to an embodiment of the present disclosure;

FIGS. 7A and 7B are views illustrating a frame structure of a position estimation request message and a response message according to various embodiments of the present disclosure;

FIG. 8 is a view illustrating a frame structure of an advertisement protocol Information Element (IE) included in a position estimation request message and a response message according to an embodiment of the present disclosure;

FIG. 9 is a view illustrating a kind of an advertisement protocol depending on an Identification (ID) of an advertisement protocol according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, an electronic device may be a device having a communication module for wireless Local Area Network (LAN) connection. For example, the electronic device may be a smartphone, a tablet Personal Computer (PC), a mobile phone, a video phone, a Personal Digital Assistant (PDA), a digital camera, an MP3 player, a navigation, a laptop computer, or a netbook, etc.

FIGS. 1 through 13, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 1:
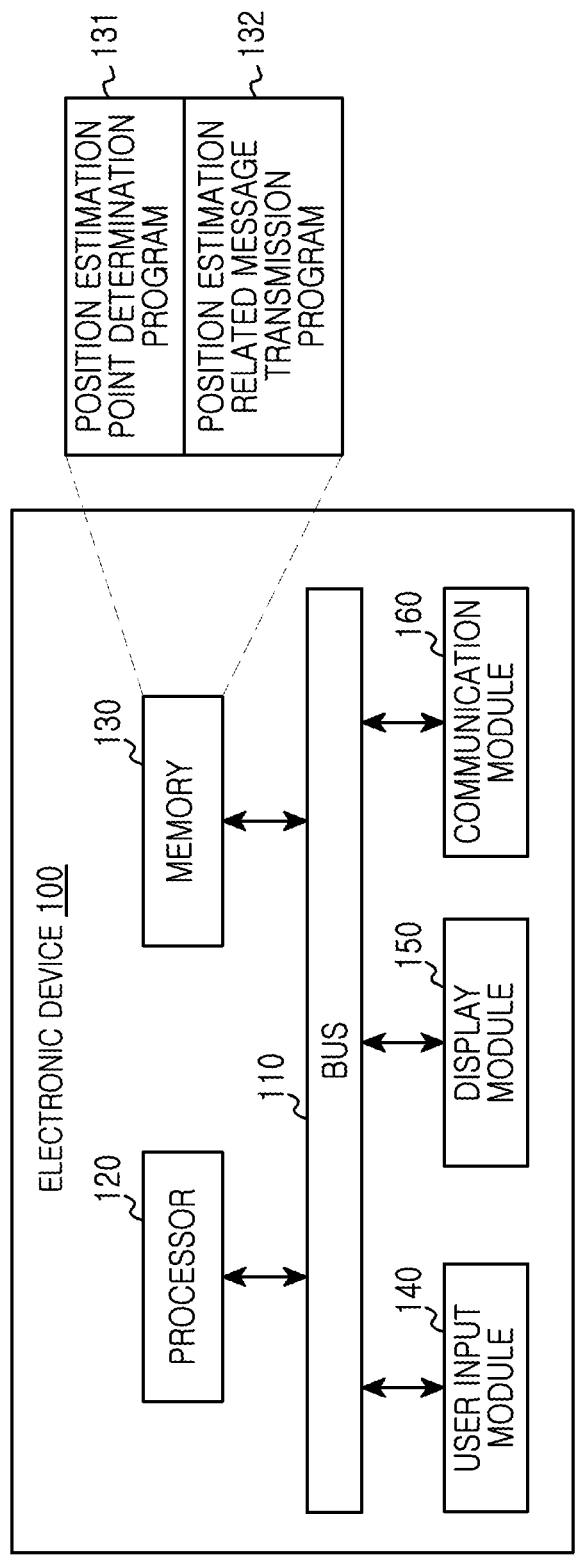
FIG. 1 is a block diagram illustrating an electronic device that estimates a position of the electronic device without a wireless Local Area Network (LAN) connection in a network-based position service according to an embodiment of the present disclosure.

FIG. 1 is a block diagram illustrating an electronic device that estimates a position of the electronic device without a wireless LAN connection in a network-based position service according to an embodiment of the present disclosure.

Referring to FIG. 1, an electronic device 100 is illustrated, where the electronic device 100 may include a bus 110, a processor 120, a memory 130, a user input module 140, a display module 150, and a communication module 160. Here, there may be a plurality of at least one of the processor 120 and the memory 130.

The bus 110 may connect elements included in the electronic device 100 and control communication between the elements included in the electronic device 100.

The processor 120 may control the electronic device to provide various services. For example, the processor 120 may decipher an instruction received from one or more elements (e.g., the memory 130, the user input module 140, the display module 150, and the communication module 160) included in the electronic device 100 via the bus 110, and execute an operation or a data process corresponding to the deciphered instruction.

The processor 120 may execute one or more programs stored in the memory 130 to control the electronic device 100 to provide various services. The processor 120 according to an embodiment of the present disclosure may control a position estimation point determination program 131 to determine state information of the electronic device 100, determine a point at which position update of the electronic device 100 is required depending on the determined state information of the electronic device 100, and determine the point at which position update is required as a position estimation point. Also, the processor 120 may control a position estimation related message transmission program 132 to transmit a position estimation request message to an Access Point (AP) at the determined position estimation point. Additionally, the processor 120 may determine a position information request point based on the determined position estimation point. The position estimation request message denotes a message requesting an AP to measure information (e.g., path loss information) required for position estimation of the electronic device 100.

The memory 130 may store an instruction or data received from or generated by one or more elements (the processor 120, the user input module 140, the display module 150, the communication module 160, etc.) included in the electronic device 100. For example, the memory 130 may store an output characteristic of a peripheral connectable to the electronic device 100 and information of an application recognized as a virtual device.

The memory 130 may store one or more programs for a service of the electronic device 100. For example, the memory 130 may include one or more of the position estimation point determination program 131 and the position estimation related message transmission program 132.

The position estimation point determination program 131 may include at least one software element for determining a position estimation point depending on state information of the electronic device 100. In more detail, the position estimation point determination program 131 may determine state information of the electronic device 100 using at least one sensor provided to the electronic device 100 or software installed in advance, and determine a position estimation point depending on the determined state information. Here, the state information of the electronic device 100 may include at least one of velocity information of the electronic device 100 and on/off information of a display screen. For example, the position estimation point determination program 131 measures a velocity of the electronic device 100 using an acceleration sensor provided to the electronic device 100, and when the measured velocity is faster than a threshold velocity, the position estimation point determination program 131 may determine to update position information of the electronic device 100, and determine a point at which the velocity of the electronic device 100 becomes faster than the threshold velocity as a position estimation point. The position estimation point determination program 131 may reduce an error of position information of the electronic device 100 by determining a position estimation point depending on the velocity of the electronic device 100. For another example, the position estimation point determination program 131 may detect an on/off of the display screen using software installed in advance in the electronic device 100, and in a case where the display screen changes from an off-state to an on-state, the position estimation point determination program 131 may determine to update position information of the electronic device 100 to determine a point at which the display screen changes from the off-state to the on-state as a position estimation point. The position estimation point determination program 131 may reduce power consumption caused by unnecessary position estimation by determining a position estimation point depending on on/off of the display screen.

In a case where a position estimation point is determined by the position estimation point determination program 131, the position estimation related message transmission program 132 may scan an AP that provides a position-based service. For example, the position estimation related message transmission program 132 may explore at least one AP that provides a position-based service by receiving a beacon request message from an AP that provides the position-based service via scanning for an AP. For another example, in a case where it is determined that position update is required by the position estimation point determination program 131, the position estimation related message transmission program 132 may explore at least one AP that provides the position-based service by transmitting a probe request message to at least one neighbor AP, and receiving a probe response message from at least one AP.

With the wireless LAN connection not being performed at a position estimation point determined by the position estimation point determination program 131, the position estimation related message transmission program 132 may transmit a position estimation request message to a scanned AP. In more detail, the position estimation related message transmission program 132 may transmit a position estimation request message to at least one scanned AP using at least one of a protocol that does not require the wireless LAN connection and an action frame. For example, the position estimation related message transmission program 132 may transmit a position estimation request message to at least one scanned AP using an ANQP of the Institute of Electrical and Electronics Engineers (IEEE) 802.11u standard.

In addition, the position estimation related message transmission program 132 may determine to transmit a position information request message after a predetermined time based on a determined position estimation point. That is, after transmitting a position estimation message based on a position estimation point, when a predetermined time elapses, the position estimation related message transmission program 132 may transmit a position information request message to at least one scanned AP. Also, the position estimation related message transmission program 132 may determine a separate position information request point to transmit a position estimation request message based on a position estimation point, and transmit a position information request message to at least one scanned AP based on a separate position information request point. A position information request message denotes a message requesting the electronic device 100 to transmit estimated position information.

The position estimation related message transmission program 132 may receive position information of the electronic device 100 from an AP as a response to a position information request message to update position information of the electronic device 100 based on the received position information.

The user input module 140 may transmit an instruction or data generated by a user's selection to the processor 120 via the bus 110. For example, the user input module 140 may include one or more of a keypad including at least one hardware button and a touch panel that may detect touch information.

The display module 150 may display an image, a video, or data to a user. The display module 150 may display updated position information of the electronic device 100.

The communication module 160 may control a connection of an AP and the electronic device 100 to transmit/receive data. The communication module 160 may include radio frequency (RF) receiver and transceiver and/or optical (for example, an infrared) receiver and transceiver. For example, the communication module 160 may include a wireless communication system for supporting one of a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Fidelity (Wi-Fi) network, a WiMax network and/or a Bluetooth network. The wireless communication system according to an embodiment of the present disclosure is not limited to the wireless communication system that supports the above-described networks, but may be a wireless communication system that supports other networks. The communication module 160 according to the present disclosure may scan an AP providing a position-based service, and transmit a position estimation request message and a position information message. Also, the communication module 160 may receive position information of the electronic device 100 from the AP.

Referring to FIG. 1, the processor 120 of the electronic device 100 determines a position estimation point and transmits a position estimation message at the determined point based on a method of executing the programs 131 and 132 stored in the memory 120. However, according to another embodiment of the present disclosure, as illustrated in FIG. 2, the processor 120 of the electronic device 100 may directly determine a position estimation point and transmit a position estimation message at the determined point.

Figure 2:
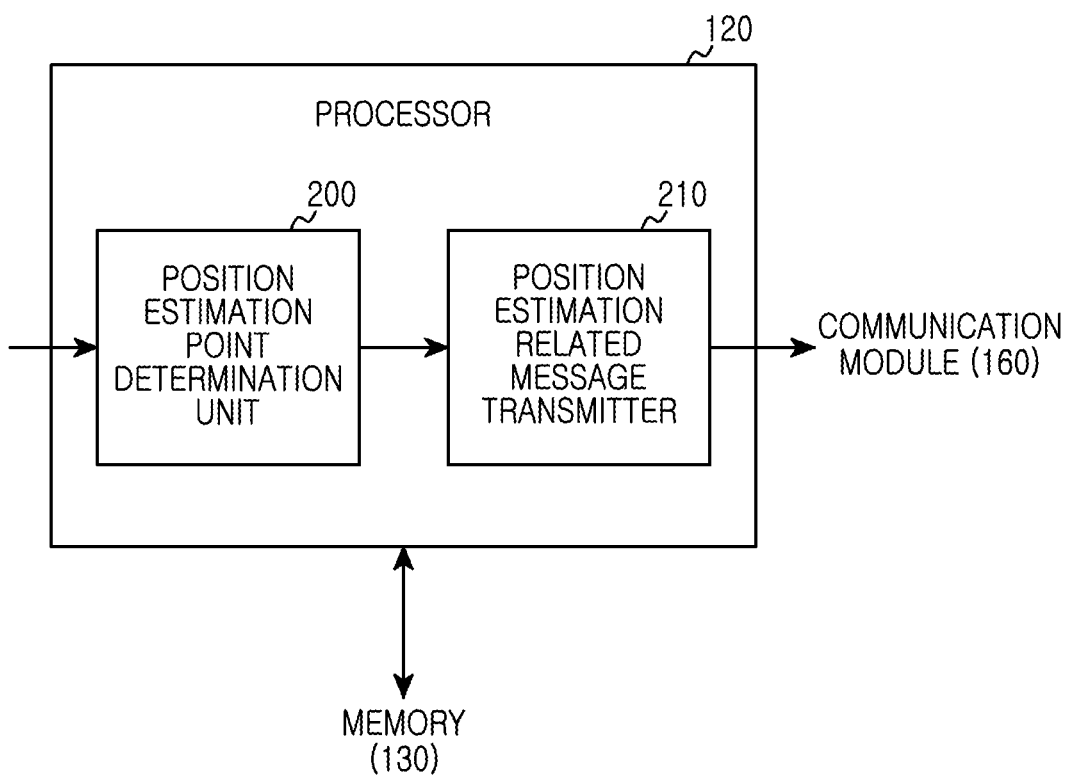
FIG. 2 is a view illustrating a processor of an electronic device that estimates a position of the electronic device without a wireless LAN connection in a network-based position service according to an embodiment of the present disclosure.

FIG. 2 is a view illustrating a processor of an electronic device that estimates a position of the electronic device without a wireless LAN connection in a network-based position service according to an embodiment of the present disclosure.

Referring to FIG. 2, a processor 120 is illustrated, where the processor 120 may include a position estimation point determination unit 200 and a position estimation related message transmitter 210, and where the processor 120 may communicate with a memory 130 and the position estimation related message transmitter 210 may communicate with a communication module 160.

The position estimation point determination unit 200 may include at least one software element for determining a position estimation point depending on state information of the electronic device 100. In more detail, the position estimation point determination unit 200 may determine state information of the electronic device 100 using at least one sensor provided to the electronic device 100 or software installed in advance, and determine a position estimation point depending on the determined state information. Here, the state information of the electronic device 100 may include at least one of velocity information of the electronic device 100 and on/off information of a display screen. For example, the position estimation point determination unit 200 measures a velocity of the electronic device 100 using an acceleration sensor provided to the electronic device 100, and when the measured velocity is faster than a threshold velocity, the position estimation point determination unit 200 may determine to update position information of the electronic device 100, and determine a point at which the velocity of the electronic device 100 becomes faster than the threshold velocity as a position estimation point. The position estimation point determination unit 200 may reduce an error of position information of the electronic device 100 by determining a position estimation point depending on the velocity of the electronic device 100. For another example, the position estimation point determination unit 200 may detect an on/off of the display screen using software installed in advance in the electronic device 100, and in a case where the display screen changes from an off-state to an on-state, the position estimation point determination unit 200 may determine to update position information of the electronic device 100 to determine a point at which the display screen changes from the off-state to the on-state as a position estimation point. The position estimation point determination unit 200 may reduce power consumption caused by unnecessary position estimation by determining a position estimation point depending on the on/off of the display screen.

In a case where a position estimation point is determined by the position estimation point determination unit 200, the position estimation related message transmitter 210 may scan an AP that provides a position-based service. For example, the position estimation related message transmitter 210 may explore at least one AP that provides a position-based service by receiving a beacon request message from an AP that provides the position-based service via scanning for an AP. Also, in a case where it is determined that position update is required by the position estimation point determination unit 200, the position estimation related message transmitter 210 may explore at least one AP that provides the position-based service by transmitting a probe request message to at least one neighbor AP, and receiving a probe response message from at least one AP.

When a wireless LAN connection is not performed at a position estimation point determined by the position estimation point determination unit 200, the position estimation related message transmitter 210 may transmit a position estimation request message to a scanned AP, via, for example, the communication module 160. In more detail, the position estimation related message transmitter 210 may transmit a position estimation request message to at least one scanned AP using at least one of a protocol that does not require a wireless LAN connection and an action frame. For example, the position estimation related message transmitter 210 may transmit a position estimation request message to at least one scanned AP using an ANQP of the IEEE 802.11u standard.

In addition, the position estimation related message transmitter 210 may determine to transmit a position information request message after a predetermined time based on a determined position estimation point. That is, after transmitting a position estimation message based on a position estimation point, when a predetermined time elapses, the position estimation related message transmitter 210 may transmit a position information request message to at least one scanned AP. Also, the position estimation related message transmitter 210 may determine a separate position information request point to transmit a position estimation request message based on a position estimation point, and transmit a position information request message to at least one scanned AP based on a separate position information request point.

The position estimation related message transmitter 210 may receive position information of the electronic device 100 from an AP as a response to a position information request message to update position information of the electronic device 100 based on the received position information.

Figure 3:
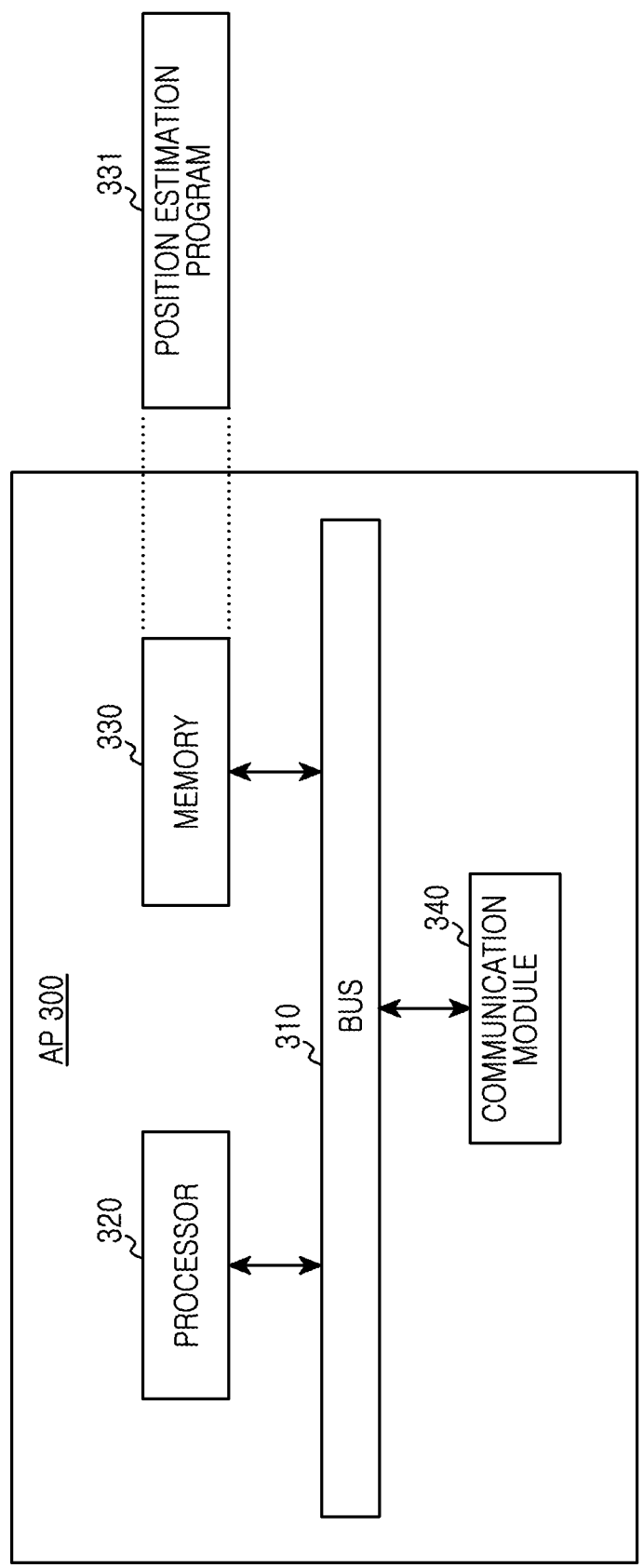
FIG. 3 is a block diagram illustrating an Access Point (AP) that provides a network-based position service according to an embodiment of the present disclosure.

FIG. 3 is a block diagram illustrating an AP that provides a network-based position service according to an embodiment of the present disclosure.

Referring to FIG. 3, an AP 300 is illustrated, where the AP 300 may include a bus 310, a processor 320, a memory 330, and a communication module 340. Here, there may be a plurality of at least one of the processor 320 and the memory 330.

The bus 310 may connect elements included in the AP 300 and control communication between the elements included in the AP 300.

The processor 320 may control the AP 300 to communicate with an electronic device 100 to provide various services to the electronic device 100. For example, the processor 320 may decipher an instruction received from one or more elements (e.g., the memory 330 and the communication module 340, etc.) included in the AP 300 via the bus 310, and execute an operation or a data process corresponding to the deciphered instruction.

The processor 320 may execute one or more programs stored in the memory 330 to control the AP 300 to provide various services. The processor 320 according to an embodiment of the present disclosure may be requested by the electronic device 100 on which a wireless LAN connection has not been performed, and control a function for position estimation of the electronic device 100 that has requested position estimation.

The memory 330 may store an instruction or data received from one or more elements (the processor 320 and the communication module 340) included in the AP 300 or generated by one or more elements. For example, the memory 330 may store information required for communication with the electronic device 100 connected with the AP 300.

The memory 330 may store one or more programs for communication of the electronic device 100. For example, the memory 330 may include a position estimation program 331.

The position estimation program 331 may include at least one software element for measuring a path loss for the electronic device 100 based on a position estimation request message received from the electronic device 100, and transmitting the measured path loss information to the AP controller. In other words, in a case where a position estimation request message is received from the electronic device 100, the position estimation program 331 may determine that position estimation of the electronic device 100 is required, measure path loss information for the electronic device 100 via the received position estimation request message, and transmit the measured path loss information to the AP controller.

In addition, in a case where a position information request message is received from the electronic device 100, the position estimation program 331 may transmit the received position information request message to a position information server. Also, in a case where a position information message is received from the position information server as a response to a position information request message, the position estimation program 331 may transmit the received position information message to the electronic device 100.

The communication module 340 may control a connection between the electronic device 100 and the AP 300 to transmit/receive data. The communication module 340 may include RF receiver and transceiver and/or optical (for example, an infrared) receiver and transceiver. For example, the communication module 340 may include a wireless LAN communication system for supporting a Wi-Fi network. A wireless LAN communication system according to an embodiment of the present disclosure is not limited to a different scheme wireless LAN communication system. The communication module 340 may periodically transmit a beacon signal under control of the processor 320, receive a probe request message from the electronic device 100, and transmit a probe response message to the electronic device 100 that has transmitted the probe request message. The communication module 340 according to an embodiment of the present disclosure may add information representing that a position-based service is provided to a beacon signal or a probe response message. The communication module 340 according to an embodiment of the present disclosure may receive a position estimation request message and a position information message from the electronic device 100. Also, the communication module 340 may communicate with the AP controller in order to estimate position of the electronic device 100.

Figure 4A:
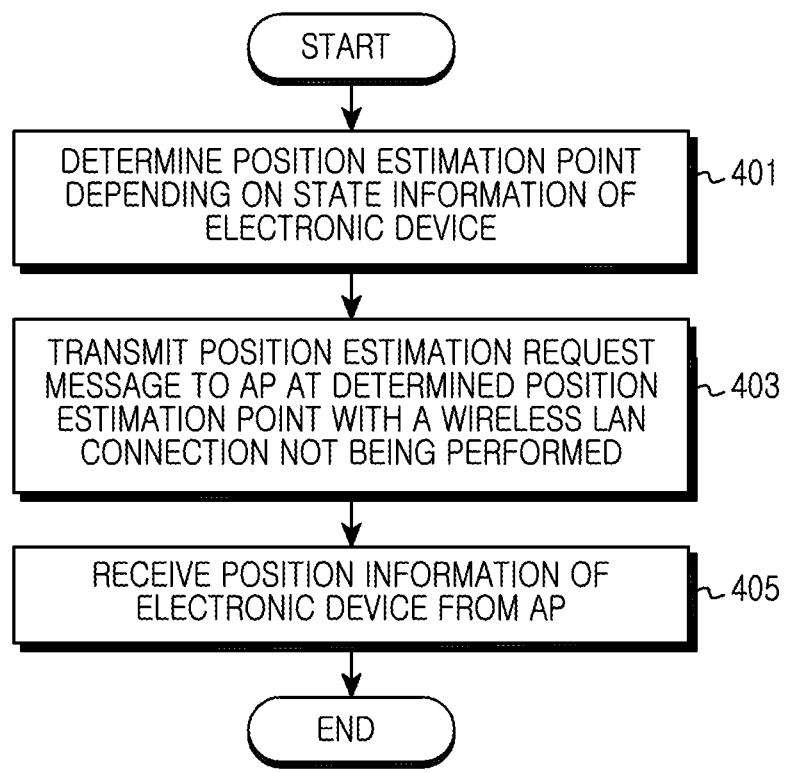
FIG. 4A is a flowchart illustrating a procedure for updating position information of an electronic device without a wireless LAN connection in the electronic device according to an embodiment of the present disclosure.

FIG. 4A is a flowchart illustrating a procedure for updating position information of an electronic device without a wireless LAN connection in the electronic device according to an embodiment of the present disclosure.

Referring to FIG. 4A, a procedure is illustrated, where an electronic device 100, as illustrated for example in FIG. 1, may determine a position estimation point depending on state information of the electronic device 100 in operation 401. In more detail, the electronic device 100 may determine state information of the electronic device 100 using at least one sensor provided to the electronic device 100 or software installed in advance, and determine a position estimation point for transmitting a position estimation request message to an AP depending on the determined state information. For example, in a case of determining a position estimation point depending on a velocity of the electronic device 100, the electronic device 100 may determine a point at which the measured velocity of the electronic device 100 becomes faster than a threshold velocity stored in advance in the electronic device 100 as the position estimation point. For another example, in a case of determining the position estimation point depending on an on/off of a display module provided to the electronic device 100, the electronic device 100 may determine a point at which the display module changes from an on-state to an off-state as the position estimation point.

The electronic device 100 may transmit a position estimation request message to an AP at the determined position estimation point in operation 403. In more detail, the electronic device 100 may transmit a position estimation request message to a scanned at least one AP using at least one of a protocol that does not require a wireless LAN connection or an action frame at the determined position estimation point. For example, the electronic device 100 may transmit a position estimation request message to a scanned at least one AP using an ANQP of the IEEE 802.11u standard that does not require Wi-Fi connection.

The electronic device 100 may receive position information of the electronic device 100 from an AP in operation 405. In other words, the electronic device 100 may receive position information from at least one AP among APs that have transmitted a position estimation request message, and update position information of the electronic device 100 based on the received position information. After that, the electronic device 100 may end a procedure according to an embodiment of the present disclosure.

FIG. 4B is a view illustrating means for updating position information of an electronic device without a wireless LAN connection in the electronic device according to an embodiment of the present disclosure.

Referring to FIG. 4B, an electronic device 100, as illustrated for example in FIG. 1, may include means 411 for determining a position estimation point depending on state information of the electronic device 100. The electronic device 100 may include at least one sensor and software that may obtain state information of the electronic device 100.

In addition, the electronic device 100 may include means 413 for transmitting a position estimation request message to an AP 300, as illustrated in FIG. 3, at a determined position estimation point with a wireless LAN connection not being performed. The electronic device 100 may include a communication module that may transmit/receive data to/from the AP 300 with a wireless LAN connection not being performed.

In addition, the electronic device 100 may include means 415 for receiving position information of the electronic device 100 from an AP. Additionally, the electronic device 100 may include means for updating position information of the electronic device 100 based on received position information and means for displaying updated position information.

Figure 5A:
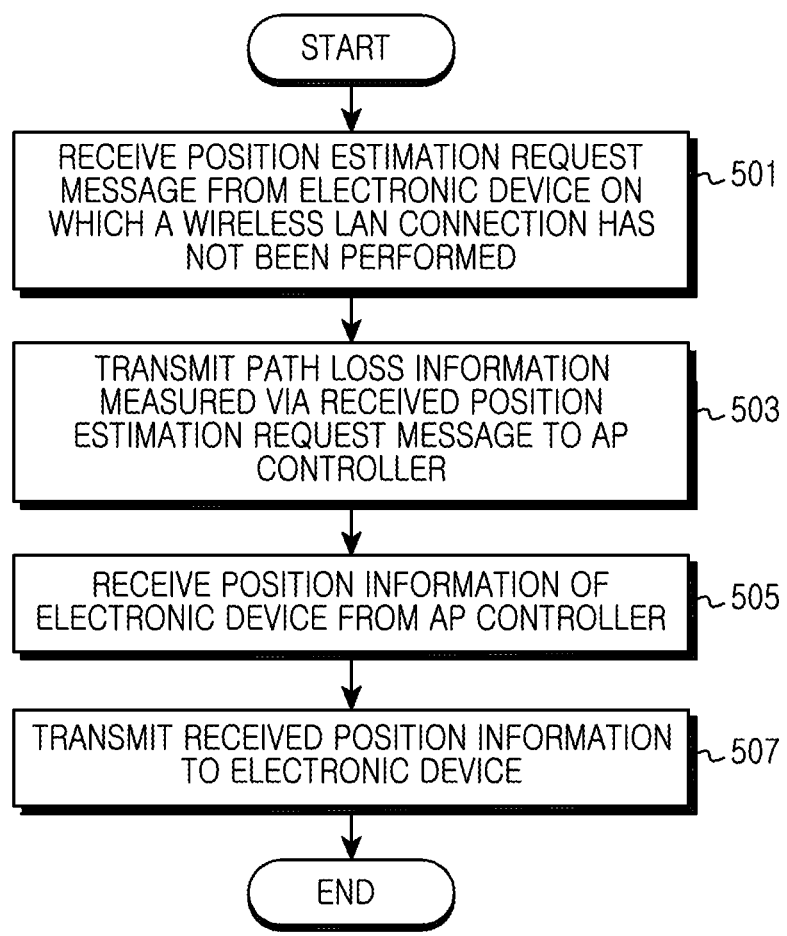
FIG. 5A is a flowchart illustrating a procedure for transmitting, at an AP, position information of an electronic device received from an AP controller to the electronic device according to an embodiment of the present disclosure.

FIG. 5A is a flowchart illustrating a procedure for transmitting, at an AP, position information of an electronic device received from an AP controller to the electronic device according to an embodiment of the present disclosure.

Referring to FIG. 5A, a procedure is illustrated, where an AP 300, as illustrated for example in FIG. 3, may receive a position estimation request message from an electronic device 100, as illustrated for example in FIG. 1, on which a wireless LAN connection has not been performed in operation 501. In more detail, the AP 300 may receive a position estimation request message using a protocol that does not require a wireless LAN connection or an action frame. For example, the AP 300 may receive a position estimation request message using an ANQP of the IEEE 802.11u standard.

The AP 300 may transmit path loss information measured via a received position estimation request message to an AP controller in operation 503. In other words, the AP 300 may measure path loss information required for position estimation of the electronic device 100 using a received position estimation request message of the electronic device 100, and transmit the measured path loss information to the AP controller.

The AP 300 may receive position information of the electronic device 100 from the AP controller in operation 505. In more detail, the AP 300 may transmit a position information request message received from the electronic device 100 to the AP controller, and receive position information of the electronic device 100 from the AP controller as a response to the position information request message.

The AP 300 may transmit the received position information to the electronic device 100 in operation 507. After that, the AP 300 may end a procedure according to an embodiment of the present disclosure.

Figure 5B:
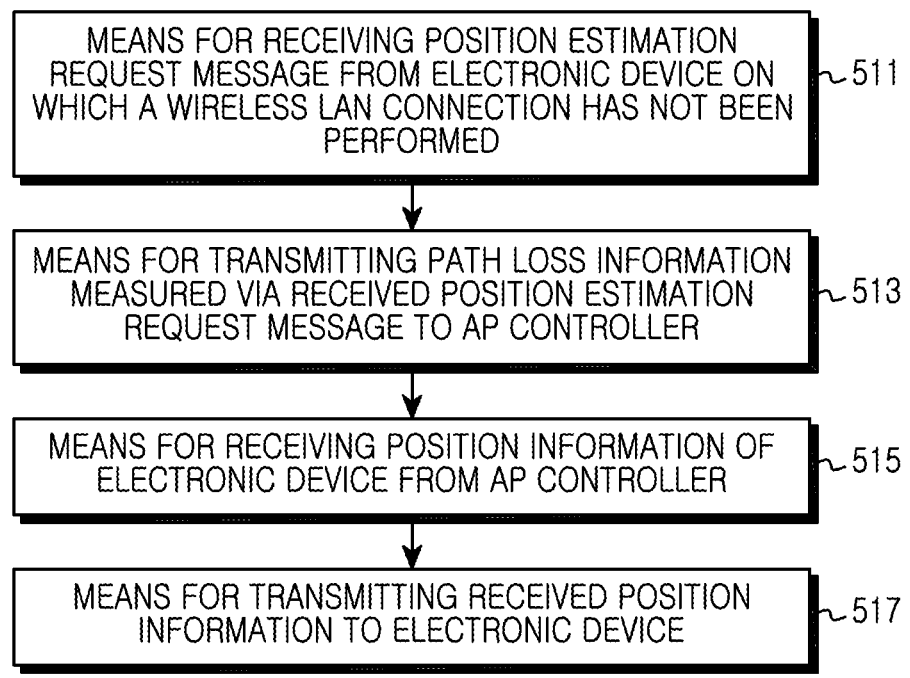
FIG. 5B is a view illustrating means for transmitting, at an AP, position information of an electronic device received from an AP controller to the electronic device according to an embodiment of the present disclosure.

FIG. 5B is a view illustrating means for transmitting, at an AP, position information of an electronic device received from an AP controller to the electronic device according to an embodiment of the present disclosure.

Referring to FIG. 5B, an AP 300, as illustrated for example in FIG. 3, may include means 511 for receiving a position estimation request message from an electronic device 100, as illustrated for example in FIG. 1, on which a wireless LAN connection has not been performed. The AP 300 may include a communication module that may transmit/receive data to/from the electronic device 100 with a wireless LAN connection not being performed.

In addition, the AP 300 may include means 513 for transmitting path loss information measured via a received position estimation request message to the AP controller. The AP 300 may include means for measuring path loss information from a position estimation request message.

In addition, the AP 300 may include means 515 for receiving position information of the electronic device 100 from the AP controller and means 517 for transmitting received position information to the electronic device 100. Also, the AP 300 may include means for receiving a position information request message of the electronic device 100 from the AP controller or a position information server, and means for transmitting the received position information request message to the AP controller or the position information server.

Figure 6:
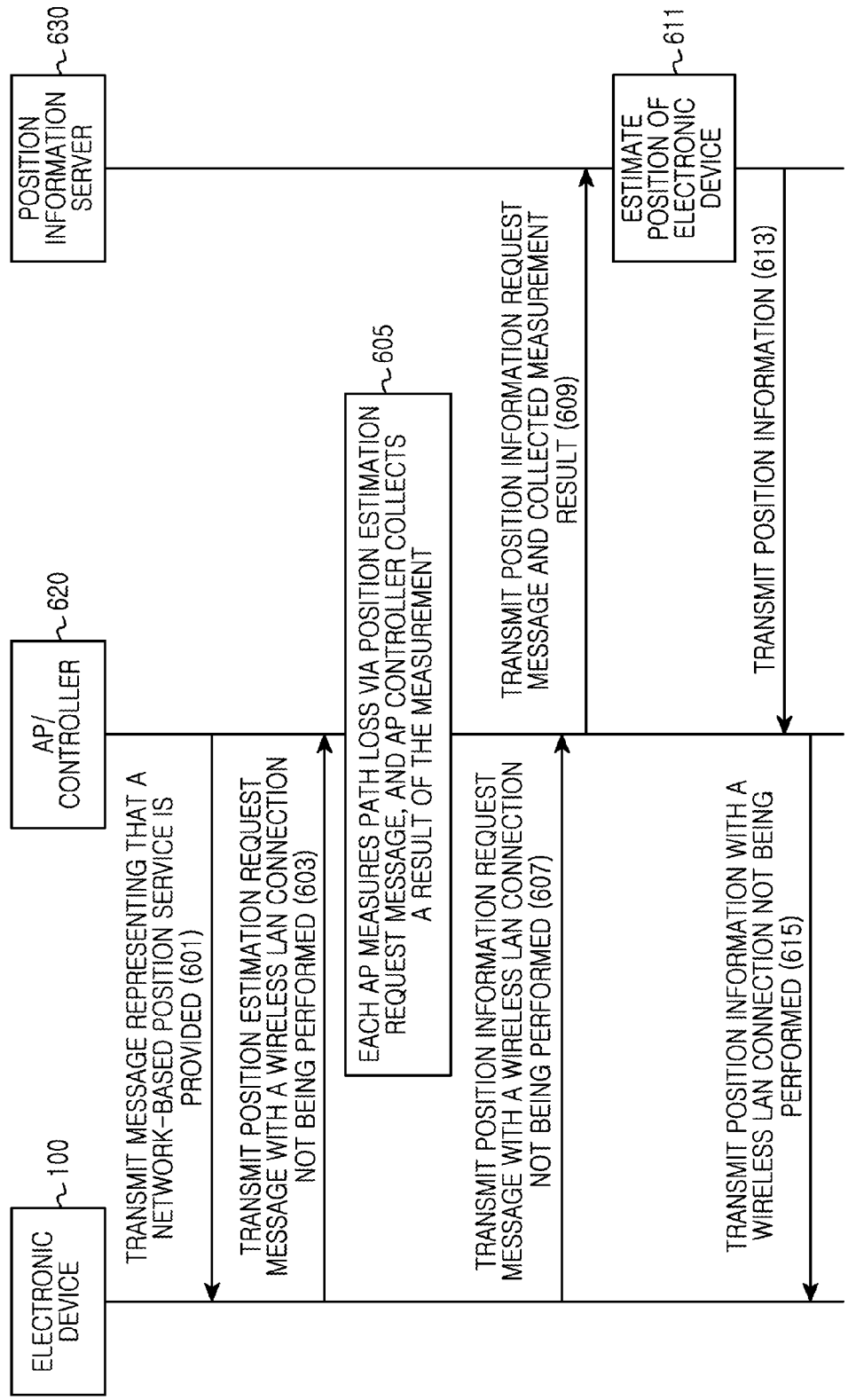
FIG. 6 is a view illustrating a signal flow that estimates a position of an electronic device in a network according to an embodiment of the present disclosure.

FIG. 6 is a view illustrating a signal flow that estimates a position of an electronic device in a network according to an embodiment of the present disclosure.

Referring to FIG. 6, though an AP/controller 620 has been illustrated as one block for convenience, the AP/controller 620 may include a plurality of APs 300, as illustrated for example in FIG. 3, and an AP controller for controlling the plurality of APs 300.

Referring to FIG. 6, the AP/controller 620 may transmit a message representing that a network-based position service is provided to an electronic device 100 in operation 601. In the AP/controller 620, each AP 300 may inform the electronic device 100 that the AP 300 provides a network-based position service using a beacon request message and a probe response message, and the electronic device 100 may explore the AP 300 that provides a network-based position service by receiving a beacon request message or a probe response message transmitted from each AP 300 via scanning at a position estimation point where it is determined that position update is required depending on state information of the electronic device 100. For example, each AP 300 may inform that the relevant AP 300 provides a network-based position service by transmitting a beacon request message to the electronic device 100. For another example, in a case where a probe request message is received from the electronic device 100, each AP 300 may inform that the AP 300 provides a network-based position service by transmitting a probe response message to the electronic device 100 as a response to a probe request message.

In operation 603, the electronic device 100 may transmit a position estimation request message to the AP 300 with a wireless LAN connection not being performed. In other words, the electronic device 100 may transmit a position estimation request message to at least one AP 300 that provides a network-based position service with a wireless LAN connection not being performed. For example, the electronic device 100 may transmit a position estimation request message to at least one AP 300 using an ANQP of the IEEE 802.11u standard.

In operation 605, each AP 300 that has received a position estimation request message may measure a path loss via a position estimation request message, transmit the measured path loss information to the AP controller, and the AP controller may collect path loss information for the electronic device 100 from each AP 300 that has received the position estimation request message.

In operation 607, the electronic device 100 may transmit a position information request message to the AP 300 with a wireless LAN connection not being performed. The electronic device 100 may transmit a position information request message to at least one AP 300 that provides a network-based position service with a wireless LAN connection not being performed. For example, the electronic device 100 may transmit a position information request message to at least one AP 300 using an ANQP of the IEEE 802.11u standard.

Though FIG. 6 has describes a method allowing an AP controller to collect loss path information and then allowing the electronic device 100 to transmit a position information request message to the AP 300 for convenience in description, the electronic device 100 may transmit a position information request message to the AP 300 before the AP controller collects loss path information depending on a design scheme. In addition, the AP 300 may transmit a received position information request message to the AP controller.

In operation 609, the AP controller may transmit a position information request message received from the AP 300 and a collected measurement result to a position information server 630. In more detail, the AP controller may transmit a position information request message received from the electronic device 100 via the AP 300 and path loss information collected from the AP controller to the position information server 630.

In a case where a position information request message and path loss information are received, the position information server 630 may estimate a position of the electronic device 100 based on received path loss information in operation 611. The position information server 630 may estimate a position of the electronic device 100 based on path loss information using a technology known in advance. In a case where a position information request message is transmitted in advance to the position information server 630 from the electronic device via the AP 300 before path loss information is collected in the AP controller, the AP controller may transmit a relevant result to the position information server 630 right after the path loss information is collected, and the position information server 630 may perform position estimation of the electronic device 100 based on a received result. In an embodiment of the present disclosure, after the AP/controller 620 collects path loss information for the electronic device 100, when a position information request message is received from the electronic device 100, the AP/controller 620 may transmit a position information request message and collected path loss information to the position information server 630, so that the position information server 630 may perform position estimation for the electronic device 100. However, in another embodiment of the present disclosure, right after collecting path loss information for the electronic device 100, while a position information request message is not received from the electronic device 100, the AP/controller 620 may transmit path loss information to the position information server 630, so that the position information server 630 may perform position estimation for the electronic device 100.

In operation 613, in a case where position estimation of the electronic device 100 is completed, the position information server 630 may transmit position information to the AP 300 via the AP controller.

In operation 615, the AP 300 or the AP controller may transmit position information to the electronic device 100 with a wireless LAN connection not being performed. According to an embodiment of the present disclosure, the AP 300 may transmit a position information response message including position information to the electronic device 100 on which wireless LAN connection has not been performed. For example, the AP 300 may transmit a position information response message to the electronic device 100 using an ANQP of the IEEE 802.11u standard.

Accordingly, the electronic device 100 may update position information of the electronic device 100.

In the description below, a structure of a message that may be transmitted/received while a wireless LAN connection is not being performed is described. As a representative example, a known generic advertisement service (GAS) initial request action frame and a known GAS initial response action frame are described. For example, the structure of the GAS initial request action frame has a structure illustrated in FIG. 7A, and the structure of the GAS initial response action frame has a structure illustrated in FIG. 7B. Here, advertisement protocol IE 701 and 703 may be defined as a structure illustrated in FIG. 8.

More specifically, FIGS. 7A and 7B are views illustrating a frame structure of a position estimation request message and a response message according to various embodiments of the present disclosure.

Referring to FIG. 7A, a GAS initial request action frame may include a category, an action, a dialog token an advertisement protocol IE 701, a query request length and a query request 705.

Referring to FIG. 7B, a GAS initial response action frame may include a category, an action, a dialog token, a status code, a GAS comeback delay, an advertisement protocol IE 703, a query response length and a query response 707.

FIG. 8 is a view illustrating a frame structure of advertisement protocol IE included in a position estimation request message and a response message according to an embodiment of the present disclosure.

FIG. 9 is a view illustrating a kind of advertisement protocol depending on an ID of an advertisement protocol according to an embodiment of the present disclosure.

Figure 10:
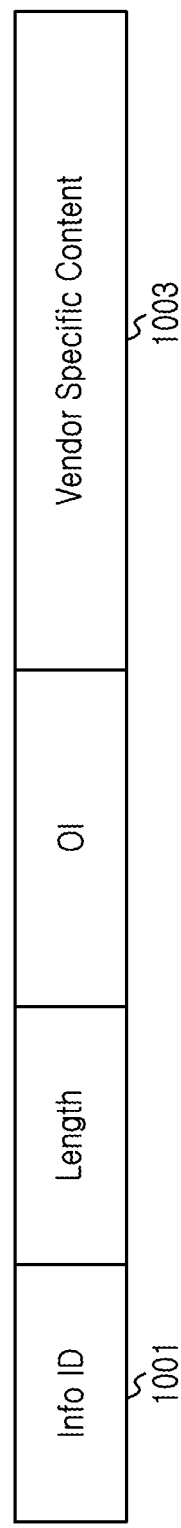
FIG. 10 is a view illustrating a structure of an inquiry request and an inquiry response of an Access Network Query Protocol (ANQP) according to an embodiment of the present disclosure.

FIG. 10 is a view illustrating a structure of an inquiry request and an inquiry response of ANQP according to an embodiment of the present disclosure.

An electronic device 100 or an AP 300, as illustrated for example in FIGS. 1 and 3, according to an embodiment of the present disclosure may set an advertisement protocol ID field 801 of an advertisement protocol IE to 0, as illustrated in FIG. 8, to use a relevant action frame as an ANQP 901 defined in the IEEE 802.11u standard, as illustrated in FIG. 9. For example, since the IEEE 802.11u standard defines a value of the ANQP as 0, the electronic device 100 may represent that a relevant action frame uses the ANQP by setting an advertisement protocol ID field 801 of an advertisement protocol IE to 0. In a case of setting an advertisement protocol ID field 801 of an advertisement protocol IE to 0, the IEEE 802.11u standard prescribes query request/response fields 705 and 707, as illustrated in FIGS. 7A and 7B, of an action frame are used as vendor specific fields 903, as illustrated in FIG. 9, so that the electronic device 100 may represent that a relevant message is a position estimation request message, a position information request message, or a position information response message using the query request/response fields 705 and 707. For example, query request/response fields 705 and 707 of an action frame may be configured as illustrated in FIG. 10, where the electronic device 100 or the AP 300 may designate an info ID field 1001 by 56797 prescribed as a vendor specific value, and add information representing a position estimation request, information representing a position information request, or position information of the electronic device 100 to a vendor specific content field 1003.

As another embodiment of the present disclosure, the electronic device 100 or the AP 300 may set a value of an advertisement protocol ID field 801 of advertisement protocol IE to 221 which is a vendor specific value 903 to represent that a relevant action frame uses a protocol defined by a business. In this case, the electronic device 100 or the AP 300 may configure an action frame for a position estimation request, a position information request, or a position information response based on a protocol defined in advance by a business.

Figure 11:
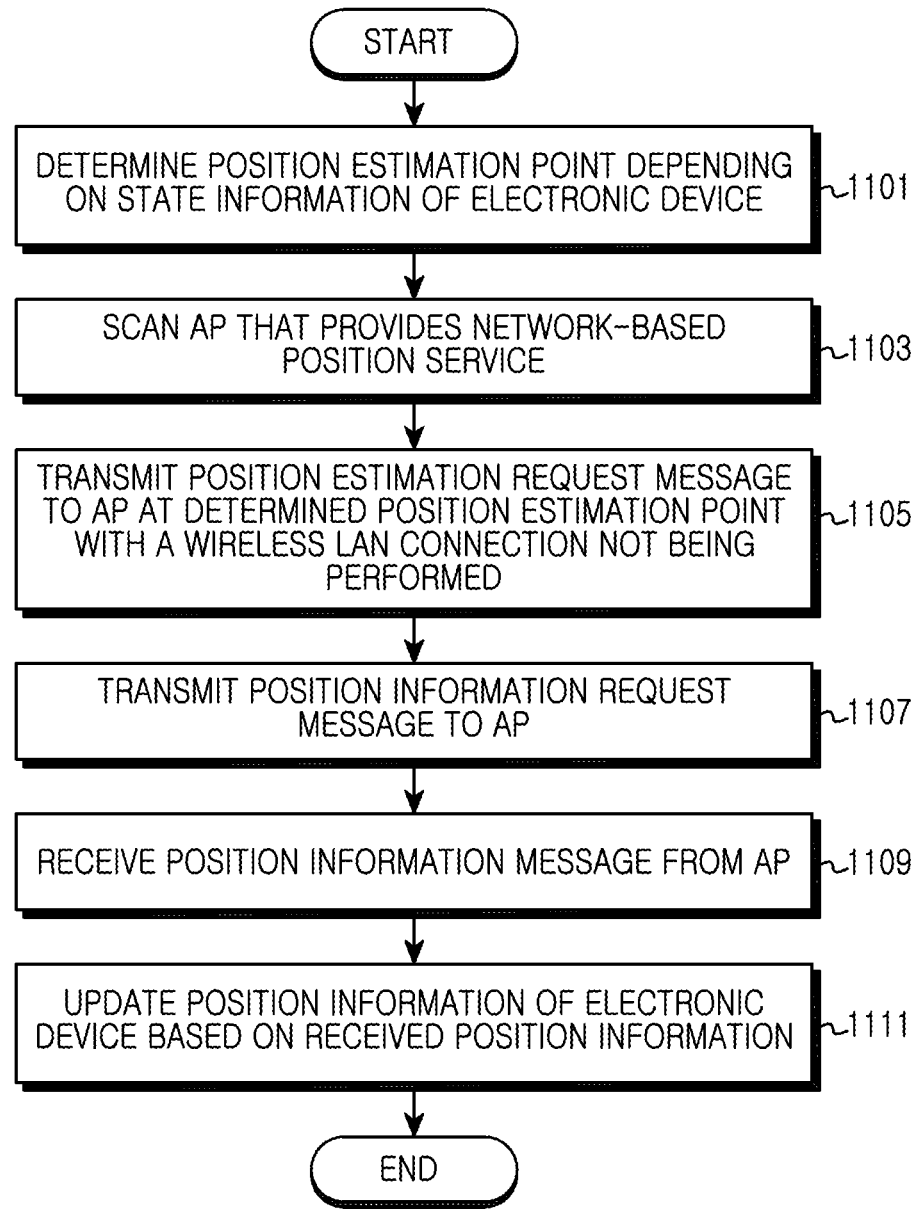
FIG. 11 is a flowchart illustrating a procedure for transmitting a position estimation request message to all scanned APs to update position information of an electronic device in the electronic device according to an embodiment of the present disclosure.

FIG. 11 is a flowchart illustrating a procedure for transmitting a position estimation request message to all scanned APs to update position information of an electronic device in the electronic device according to an embodiment of the present disclosure.

Referring to FIG. 11, an electronic device 100, as illustrated for example in FIG. 1, may determine a position estimation point depending on state information of the electronic device 100 in operation 1101. In more detail, the electronic device 100 may determine state information of the electronic device 100 using at least a sensor provided to the electronic device 100 or software installed in advance, and determine a position estimation point depending on the determined state information. Here, state information of the electronic device 100 may include at least one of velocity information of the electronic device 100 and on/off information of a display screen.

In operation 1103, the electronic device 100 may scan an AP 300, as illustrated for example in FIG. 3, which provides a network-based position service. In other words, the electronic device 100 may scan at least one neighbor AP to explore an AP that provides a network-based position service. For example, the electronic device 100 may explore at least one AP that provides a position-based service by receiving a beacon request message from the AP that provides the position-based service via scanning for APs. For another example, in a case where a position estimation point is determined, the electronic device 100 may explore at least one AP that provides the position-based service by transmitting a probe request message to at least one neighbor AP and receiving a probe response message from at least one AP.

In operation 1105, the electronic device 100 may transmit a position estimation request message to an AP at a determined position estimation point with a wireless LAN connection not being performed. In more detail, the electronic device 100 may transmit a position estimation request message to at least one scanned AP 300 using at least one of a protocol that does not require a wireless LAN connection or an action frame. For example, the electronic device 100 may transmit a position estimation request message to at least one scanned AP 300 using an ANQP of the IEEE 802.11u standard.

In operation 1107, the electronic device 100 may transmit a position information request message to the AP 300. The electronic device 100 may transmit a position information request message to at least one scanned AP 300 after a predetermined time based on a determined position estimation point, or transmit a position information request message to at least one scanned AP 300 based on a separate position request point. The electronic device 100 may transmit a position information request message requesting position information to the AP 300 with a wireless LAN connection not being performed. For example, the electronic device 100 may transmit a position information request message to the AP 300 using an ANQP of the IEEE 802.11u standard.

In operation 1109, the electronic device 100 may receive a position information message from the AP 300. The electronic device 100 may receive a position information response message including position information of the electronic device 100 from the AP 300 with a wireless LAN connection not being performed. For example, the electronic device 100 may receive a position information response message from the AP 300 using an ANQP of the IEEE 802.11u standard.

In operation 1111, the electronic device 100 may update position information of the electronic device 100 based on received position information. After that, the electronic device 100 ends the procedure according to an embodiment of the present disclosure.

Figure 12:
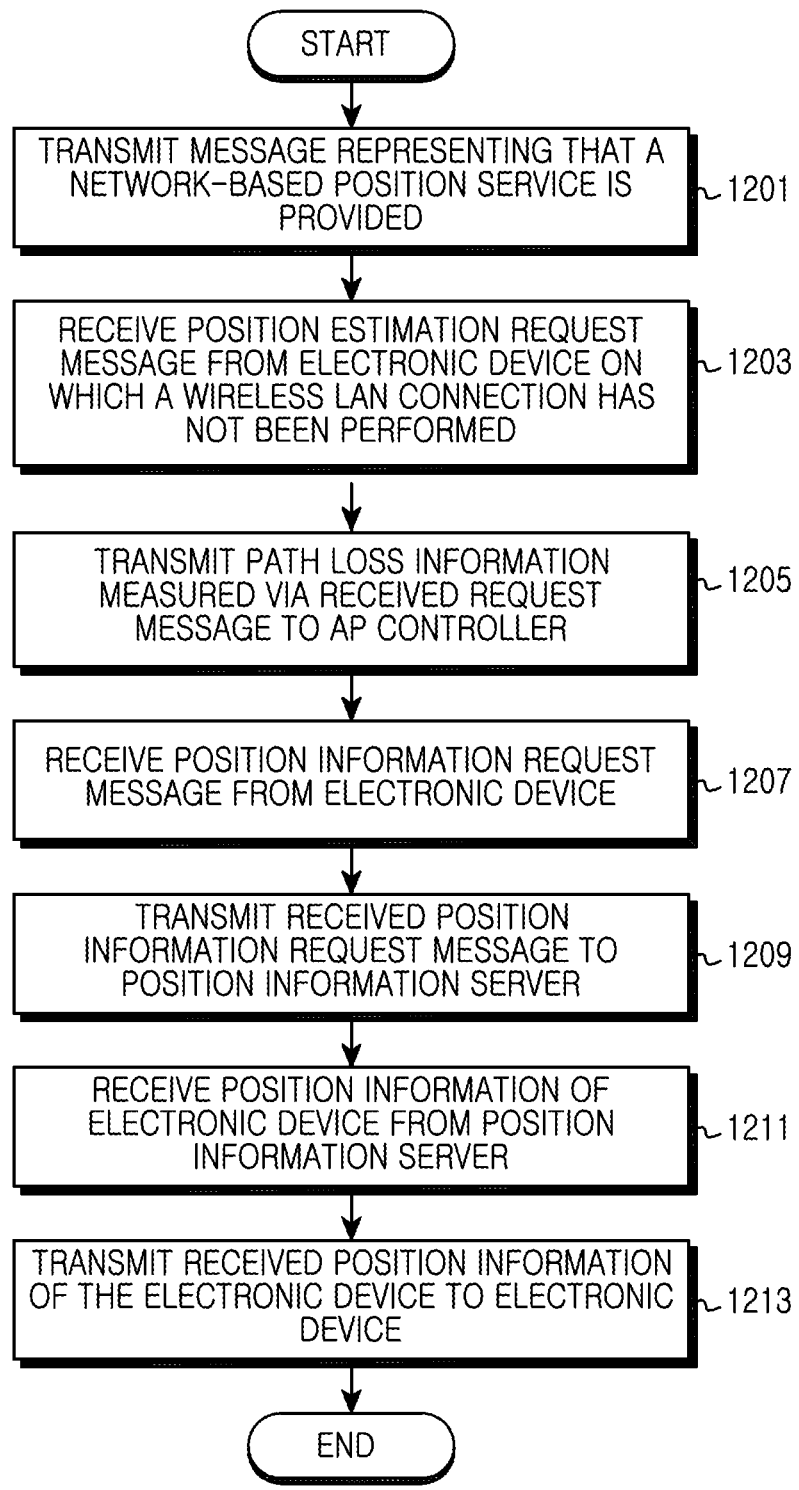
FIG. 12 is a flowchart illustrating a procedure for transmitting updated position information of an electronic device when an AP receives a position estimation request message according to an embodiment of the present disclosure.

FIG. 12 is a flowchart illustrating a procedure for transmitting updated position information of an electronic device when an AP receives a position estimation request message according to an embodiment of the present disclosure.

Referring to FIG. 12, in operation 1201, an AP 300, as illustrated for example in FIG. 3, may transmit a message representing that a network-based position service is provided to an electronic device 100, as illustrated for example in FIG. 1. For example, the AP 300 may inform that the AP 300 provides the network-based position service by transmitting a beacon request message to the electronic device 100. For another example, in a case where a probe request message is received from the electronic device 100, the AP 300 may inform that the AP 300 provides a network-based position service by transmitting a probe response message to the electronic device 100 as a response to the probe request message.

In operation 1203, the AP 300 may receive a position estimation request message from the electronic device 100 on which a wireless LAN connection has not been performed. In other words, the AP 300 may receive a position estimation request message from the electronic device 100 on which the wireless LAN connection has not been performed using at least one of a protocol that does not require wireless LAN connection or an action frame.

In operation 1205, the AP 300 may transmit path loss information measured via a received request message to an AP controller. In other words, in a case where a position estimation request message is received from the electronic device 100, the AP 300 may measure path loss information via a received position estimation request message, and transmit the measured path loss information to the AP controller.

In operation 1207, the AP 300 may receive a position information request message from the electronic device 100. Similarly with a case of receiving a position estimation request message, the AP 300 may receive a position information request message using a protocol that does not require a wireless LAN connection or an action frame.

In operation 1209, the AP 300 may transmit a received position information request message to a position information server. In more detail, the AP 300 may transmit a received position information request message to a position information server via the AP controller.

In operation 1211, the AP 300 may receive position information of the electronic device 100 from the position information server as a response to a position information request message.

In operation 1213, the AP 300 may transmit received position information of the electronic device 100 to the electronic device 100. The AP 300 may transmit position information to the electronic device 100 using a protocol that does not require a wireless LAN connection or an action frame. After that, the electronic device 100 ends the procedure according to an embodiment of the present disclosure.

Figure 13:
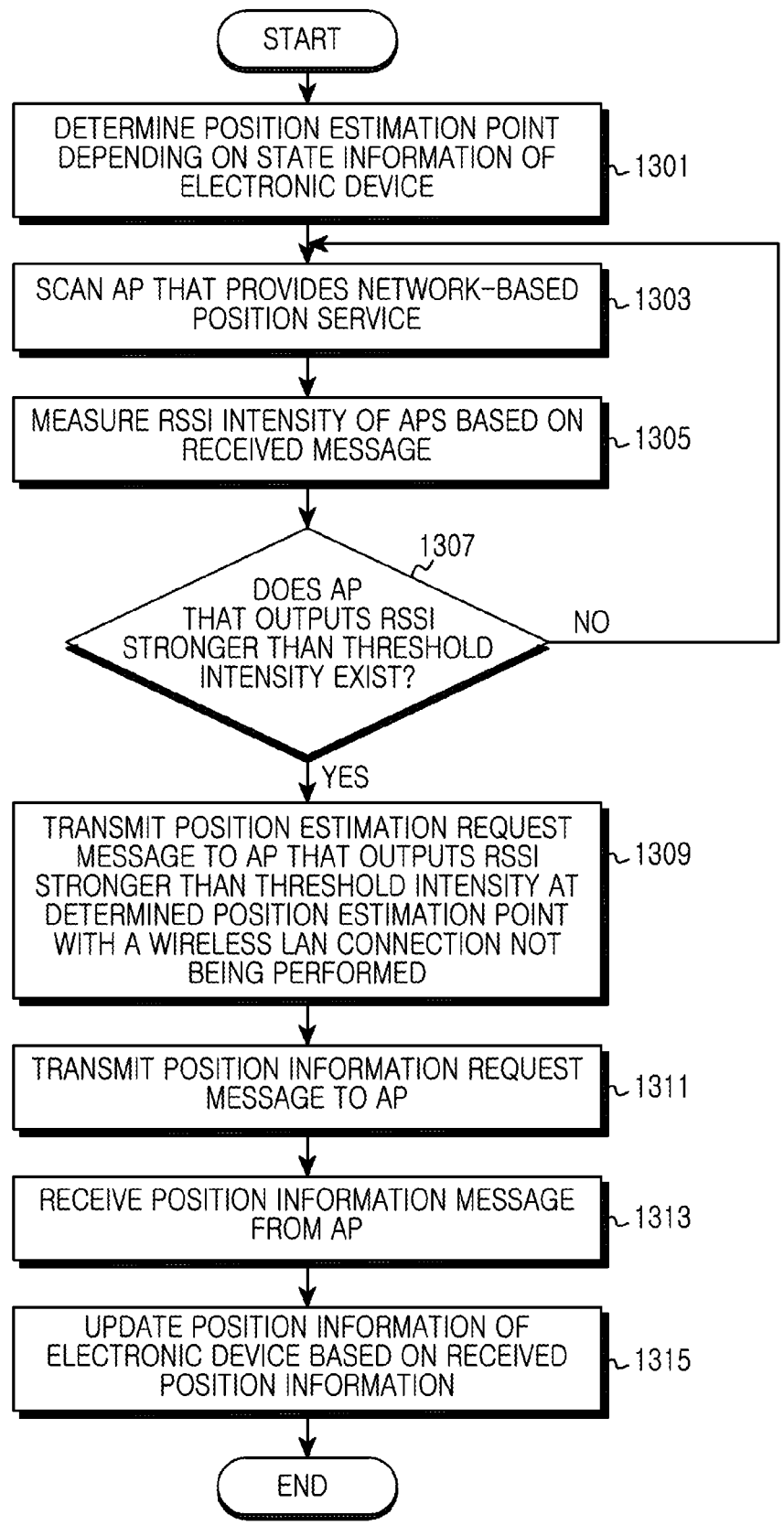
FIG. 13 is a flowchart illustrating a procedure for transmitting a position estimation request message to an AP that meets a condition set in advance among scanned APs to update position information of an electronic device in the electronic device according to another embodiment of the present disclosure.

FIG. 13 is a flowchart illustrating a procedure for transmitting a position estimation request message to an AP that meets a condition set in advance among scanned APs to update position information of an electronic device in the electronic device according to another embodiment of the present disclosure.

Referring to FIG. 13, in operation 1301, an electronic device 100, as illustrated for example in FIG. 1, may determine a position estimation point depending on state information of the electronic device 100. In more detail, the electronic device 100 may determine state information of the electronic device 100 using at least one sensor provided to the electronic device 100 or software installed in advance, and determine a position estimation point depending on the determined state information. Here, the state information of the electronic device 100 may include at least one of velocity information of the electronic device 100 and on/off information of a display screen.

In operation 1303, the electronic device 100 may scan an AP 300, as illustrated for example in FIG. 3, which provides a network-based position service. In other words, the electronic device 100 may scan at least one neighbor AP to explore an AP that provides the network-based position service. For example, the electronic device 100 may explore at least one AP that provides a position-based service by receiving a beacon request message from an AP that provides the position-based service via scanning for APs. For another example, in a case where a position estimation point is determined, the electronic device 100 may explore at least one AP that provides a position-based service by transmitting a probe request message to at least one neighbor AP and receiving a probe response message from at least one AP.

In operation 1305, the electronic device 100 may measure a Received Signal Strength Indication (RSSI) intensity of APs based on a received message. In more detail, the electronic device 100 may measure the RSSI intensity of scanned APs based on a beacon request message or a probe response message received from the scanned APs.

In operation 1307, the electronic device 100 may determine whether an AP that outputs RSSI stronger than a threshold intensity exists. In other words, the electronic device 100 may compare a threshold RSSI intensity set in advance with measured RSSI to determine whether an AP that outputs RSSI stronger than the threshold intensity exists.

In a case where an AP that outputs RSSI stronger than the threshold intensity exists (i.e., YES in operation 1307), the electronic device 100 may transmit a position estimation request message to the AP that outputs RSSI stronger than the threshold intensity at a determined position estimation point with a wireless LAN connection not being performed in operation 1309. In a case where RSSI intensity received by the electronic device 100 is weaker than the threshold intensity, the AP that outputs the relevant RSSI may be located at a distant place from the electronic device 100, so that it may be difficult to estimate an accurate position of the electronic device 100. Accordingly, for estimation of an accurate position of the electronic device 100, the electronic device 100 may set a threshold RSSI intensity and transmit a position estimation request message to only APs that output RSSI stronger than the threshold RSSI intensity.

In operation 1311, the electronic device 100 may transmit a position information request message to the AP 300. The electronic device 100 may transmit a position information request message requesting position information to the AP 300 with a wireless LAN connection not being performed. For example, the electronic device 100 may transmit a position information request message to the AP 300 using an ANQP of the IEEE 802.11u standard.

In operation 1313, the electronic device 100 may receive a position information message from the AP 300. The electronic device 100 may receive a position information response message including position information of the electronic device 100 from the AP 300 with a wireless LAN connection not being performed. For example, the electronic device 300 may receive a position information response message using an ANQP of the IEEE 802.11u standard from the AP 300.

In operation 1315, the electronic device 100 may update position information of the electronic device 100 based on received position information. After that, the electronic device 100 may end the procedure according to an embodiment of the present disclosure.

In contrast, in a case where the AP that outputs RSSI stronger than the threshold intensity does not exist in operation 1307 (i.e., NO in operation 1307), the electronic device 100 may return to operation 1303 to re-perform subsequent operations.

An embodiment and all functional operation of the disclosure described in the present specification may be embodied by computer software or hardware including a structure disclosed by the present specification and equivalent structures thereof, or a combination of one or more of these. Also, embodiments of the disclosure described in the present specification may be executed by one or more computer program products, that is, a data processing device, or one or more modules of computer program instructions encoded on a computer-readable medium for controlling an operation of this device.

A computer-readable medium may be a machine-readable storage medium, a machine-readable storage substrate, a memory device, composition of a material influencing machine-readable radio wave stream, or a combination of one or more of these. A terminology of a data processing device may include, for example, a programmable processor, a computer, or all devices for processing data including a multi-processor or a computer, a device, and a machine.

The device may include a code for generating an execution environment for a relevant computer program in addition to hardware, for example, a code forming a processor firmware, a protocol stack, a database management system, an operation system, or a combination of one or more of these.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
   determining, by the electronic device, a position estimation point according to state information of the electronic device;
   transmitting a position estimation request message to an access point (AP) at the determined position estimation point with a wireless local area network (LAN) connection not being performed; and
   receiving position information of the electronic device from the AP,
   wherein the position estimation request message is configured based on a protocol that does not require the wireless LAN connection and an action frame.

2. The method of claim 1, wherein the state information of the electronic device comprises at least one of velocity information of the electronic device and on/off information of a display screen.

3. The method of claim 2, wherein the determining of the position estimation point according to the state information of the electronic device comprises:
   comparing a velocity of the electronic device with a threshold velocity; and
   determining the position estimation point based on a point at which the velocity of the electronic device becomes equal to or greater than the threshold velocity.

4. The method of claim 2, wherein the determining of the position estimation point according to the state information of the electronic device comprises determining the position estimation point based on a point where an on/off state of the display screen of the electronic device changes.

5. The method of claim 1, wherein the transmitting of the position estimation request message to the AP at the determined position estimation point with the wireless LAN connection not being performed comprises:
   exploring, by scanning, at least one AP that is to transmit the position estimation request message; and
   transmitting the position estimation request message to the at least one explored AP at the position estimation point with the wireless LAN connection not being performed.

6. The method of claim 5, wherein the transmitting of the position estimation request message to the AP at the determined position estimation point with the wireless LAN connection not being performed comprises:
   measuring a received signal strength indication (RSSI) of the at least one explored AP; and
   transmitting the position estimation request message to at least one selected AP at the position estimation point with the wireless LAN connection not being performed.

7. The method of claim 1, further comprising:
   transmitting a message requesting a transmission of the position information to the AP within a time set in advance from a point at which the position estimation request message has been transmitted,
   wherein the receiving of the position information of the electronic device from the AP comprises receiving the position information of the electronic device from the AP via a response message in response to the message requesting the transmission of the position information.

8. The method of claim 7, wherein the message requesting the transmission of the position information and the response message are configured based on at least one of the protocol that does not require the wireless LAN connection and the action frame.

9. A method for operating an access point (AP), the method comprising:
   receiving, by the AP, a position estimation request message from an electronic device on which a wireless local area network (LAN) connection has not been performed;
   transmitting path loss information measured via the received position estimation request message to an AP manager;
   receiving position information of the electronic device from the AP manager; and
   transmitting the received position information to the electronic device,
   wherein the position estimation request message is configured based on a protocol that does not require the wireless LAN connection and an action frame.

10. The method of claim 9, further comprising:
    receiving a message requesting a transmission of the position information from the electronic device,
    wherein the transmitting of the received position information to the electronic device comprises transmitting the received position information to the electronic device via a response message in response to the message requesting the transmission of the position information.

11. The method of claim 10, wherein the position estimation request message and the response message are configured based on at least one of the protocol that does not require the wireless LAN connection and the action frame.

12. An electronic device comprising:
    one or more processors;
    a transceiver;
    a memory; and
    one or more programs stored in the memory and configured to be executed by the one or more processors,
    wherein the one or more programs, when executed by the one or more processors, cause the one or more processors to:
       determine a position estimation point according to state information of the electronic device;
       transmit a position estimation request message to an access point (AP) at the determined position estimation point with a wireless local area network (LAN) connection not being performed; and
       receive position information of the electronic device from the AP, and
    wherein the position estimation request message is configured based on a protocol that does not require the wireless LAN connection and an action frame.

13. The electronic device of claim 12, wherein the state information of the electronic device comprises at least one of velocity information of the electronic device and on/off information of a display screen.

14. The electronic device of claim 13, wherein the one or more programs, when executed by the one or more processors, further cause the one or more processors to:
compare a velocity of the electronic device with a threshold velocity, and
determine the position estimation point based on a point at which the velocity of the electronic device becomes equal to or greater than the threshold velocity.

15. The electronic device of claim 13, wherein the one or more programs, when executed by the one or more processors, further cause the one or more processors to determine the position estimation point based on a point where an on/off state of the display screen of the electronic device changes.

16. The electronic device of claim 12, wherein the one or more programs, when executed by the one or more processors, further cause the one or more processors to:
explore, by scanning, at least one AP that is to transmit the position estimation request message, and
transmit the position estimation request message to the at least one explored AP at the position estimation point with the wireless LAN connection not being performed.

17. The electronic device of claim 16, wherein the one or more programs, when executed by the one or more processors, further cause the one or more processors to:
measure a received signal strength indication (RSSI) of the at least one explored AP, and
transmit the position estimation request message to at least one selected AP at the position estimation point with the wireless LAN connection not being performed.

18. The electronic device of claim 12, wherein the one or more programs, when executed by the one or more processors, further cause the one or more processors to:
transmit a message requesting a transmission of the position information to the AP within a time set in advance from a point at which the position estimation request message has been transmitted, and
receive the position information of the electronic device from the AP via a response message in response to the message requesting the transmission of the position information.

19. The electronic device of claim 18, wherein the message requesting the transmission of the position information and the response message are configured based on at least one of the protocol that does not require the wireless LAN connection and the action frame.

20. An access point (AP) device comprising:
one or more processors;
a transceiver;
a memory; and
one or more programs stored in the memory and configured to be executed by the one or more processors,
wherein the one or more programs, when executed by the one or more processors, cause the one or more processors to:
receive a position estimation request message from an electronic device on which a wireless local area network (LAN) connection has not been performed;
transmit path loss information measured via the received position estimation request message to an AP manager;
receive position information of the electronic device from the AP manager; and
transmit the received position information to the electronic device, and
wherein the position estimation request message is configured based on a protocol that does not require the wireless LAN connection and an action frame.

21. The AP device of claim 20, wherein the one or more programs, when executed by the one or more processors, further cause the one or more processors to:
receive a message requesting a transmission of the position information from the electronic device, and
transmit the received position information to the electronic device via a response message in response to the message requesting the transmission of the position information.

22. The AP device of claim 21, wherein the position estimation request message and the response message are configured based on at least one of the protocol that does not require the wireless LAN connection and the action frame.

23. The AP device of claim 20, wherein the position estimation request message and the response message include an advertisement protocol information element.

* * * * *